US009215184B2

(12) United States Patent
Turner et al.

(10) Patent No.: US 9,215,184 B2
(45) Date of Patent: Dec. 15, 2015

(54) METHODS OF AND APPARATUS FOR MANAGING NON-CONGESTION-CONTROLLED MESSAGE TRAFFIC IN A DATACENTER (75) Inventors: Yoshio Turner, San Francisco, CA (US); Jose Renato G Santos, San Jose, CA (US); Niraj Tolia, Mountain View, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 646 days.

(21) Appl. No.: 13/275,030

(22) Filed: Oct. 17, 2011

(65) Prior Publication Data

US 2013/0094508 A1 Apr. 18, 2013

(51) Int. Cl.
*H04L 12/28* (2006.01)
*H04L 12/56* (2006.01)
*H04L 12/801* (2013.01)
*H04L 12/46* (2006.01)

(52) U.S. Cl.
CPC ............ *H04L 47/35* (2013.01); *H04L 12/4633* (2013.01); *H04L 47/12* (2013.01); *H04L 47/19* (2013.01)

(58) Field of Classification Search
CPC ..... H04L 47/10; H04L 49/70; H04L 12/4633; H04L 47/19; H04L 47/12
USPC .................................................. 370/392, 389
See application file for complete search history.

(56) References Cited

U.S. PATENT DOCUMENTS

| 7,032,111 | B1 | 4/2006 | Ruutu et al. |
| 2002/0071434 | A1* | 6/2002 | Furukawa ...................... 370/392 |
| 2003/0023746 | A1* | 1/2003 | Loguinov ...................... 709/235 |
| 2003/0099243 | A1* | 5/2003 | Oh et al. .................. 370/395.21 |
| 2004/0246991 | A1* | 12/2004 | Tsuzuki et al. ............... 370/466 |
| 2006/0080733 | A1* | 4/2006 | Khosmood et al. ............. 726/13 |
| 2006/0221825 | A1* | 10/2006 | Okano .......................... 370/229 |
| 2007/0242696 | A1* | 10/2007 | Signaoff et al. ............... 370/469 |
| 2007/0274210 | A1* | 11/2007 | Jang ............................. 370/229 |
| 2008/0002576 | A1 | 1/2008 | Bugenhagen et al. |
| 2009/0268614 | A1 | 10/2009 | Tay et al. |
| 2009/0303880 | A1 | 12/2009 | Maltz et al. |
| 2010/0182905 | A1* | 7/2010 | Matsushita et al. ........... 370/232 |

(Continued)

FOREIGN PATENT DOCUMENTS

EP 1341350 A1 9/2003

OTHER PUBLICATIONS hp Labs Report 2010-151 "Gatekeeper Distributed Rate Control for Virtualized Datacenters".

(Continued)

*Primary Examiner* — Shripal Khajuria
*Assistant Examiner* — Faisal Choudhury
(74) *Attorney, Agent, or Firm* — Law Office of Michael Dryja (57) ABSTRACT Managing non-congestion-controlled message traffic in a datacenter. Any non-congestion-controlled packets originating in a sending server and intended for a receiving server are encapsulated in the sending server and transmitted through a virtual circuit having a message transport protocol with rate control. The packets are decapsulated in the receiving server.

18 Claims, 7 Drawing Sheets

(56) References Cited

U.S. PATENT DOCUMENTS

| | | | |
|---|---|---|---|
| 2011/0075664 A1* | 3/2011 | Lambeth et al. | 370/390 |
| 2011/0320632 A1* | 12/2011 | Karino | 709/238 |
| 2012/0155467 A1* | 6/2012 | Appenzeller | 370/392 |
| 2012/0250512 A1* | 10/2012 | Jagadeeswaran et al. | 370/235.1 |
| 2013/0086236 A1* | 4/2013 | Baucke et al. | 709/223 |

OTHER PUBLICATIONS

Rodrigues, "Gatekeeper: Supporting Bandwidth Guarantees for Multi-tenant Datacenter Networks".

Shieh, Alan et al, "Seawall: Performance Isolation for Cloud Datacenter Networks".

* cited by examiner

0
METHODS OF AND APPARATUS FOR MANAGING NON-CONGESTION-CONTROLLED MESSAGE TRAFFIC IN A DATACENTER

BACKGROUND

Modern datacenters typically house hundreds or even thousands of servers. Each server is a computer system that may support one or more tenants. A server that supports multiple tenants typically runs multiple virtual machines ("VMs") for these tenants. A VM is a software implementation of a computer. From the perspective of a tenant who has a VM residing in a server, the VM behaves as if it were a physical computer. The VMs communicate with each other by electronic messages. A VM in which a message originates hands one or more packets containing the message over to a communication facility in the server in which the originating VM resides. The communication facility, which typically may be a virtual switch, sends the packets to the server in which the destination VM resides. Traffic through the communication network must be controlled to ensure appropriate levels of service for all tenants. Congestion control protocols such as Transmission Control Protocol (TCP) provide this control by delaying packet transmission or by selectively dropping packets at arbitrary locations along network paths if there are too many packets for the available network bandwidth. An originating server responds to delays and dropped packets by slowing down its transmission rate.

BRIEF DESCRIPTION OF DRAWINGS

The drawings illustrate by example principles of the invention.

DETAILED DESCRIPTION

In the drawings and in this description, examples and details are used to illustrate principles of the invention. Other configurations may suggest themselves. Some known methods and structures have not been described in detail in order to avoid obscuring the invention. Accordingly, the invention may be practiced without limitation to the details and arrangements as described. The invention is to be limited only by the claims, not by the drawings or this description.

Methods defined by the claims may comprise steps in addition to those listed, and except as indicated in the claims themselves the steps may be performed in another order than that given.

Many datacenter tenants use non-congestion-controlled traffic protocols, for example User Datagram Protocol (UDP), that do not slow down transmission rates because of packet drops. Even TCP traffic may not adjust transmission rates in response to packet drops if the TCP traffic consists of mostly short-lived connections in which each connection transmits only a small number of packets before shutting down, or if tenants use versions of TCP that fail to adjust transmission rates appropriately. If traffic sources do not obey TCP-like congestion control rules, then upstream switch and link resources may continue to be congested, because the traffic sources do not reduce their transmission rate in response to dropped packets or queuing. This is particularly troublesome if a monitor link is located at a receiving server, since the entire network path from the originating server to the receiving server may be congested. There has been a need for a way to manage non-congestion-controlled message traffic in a datacenter to prevent communication network congestion.

Figure 1A:
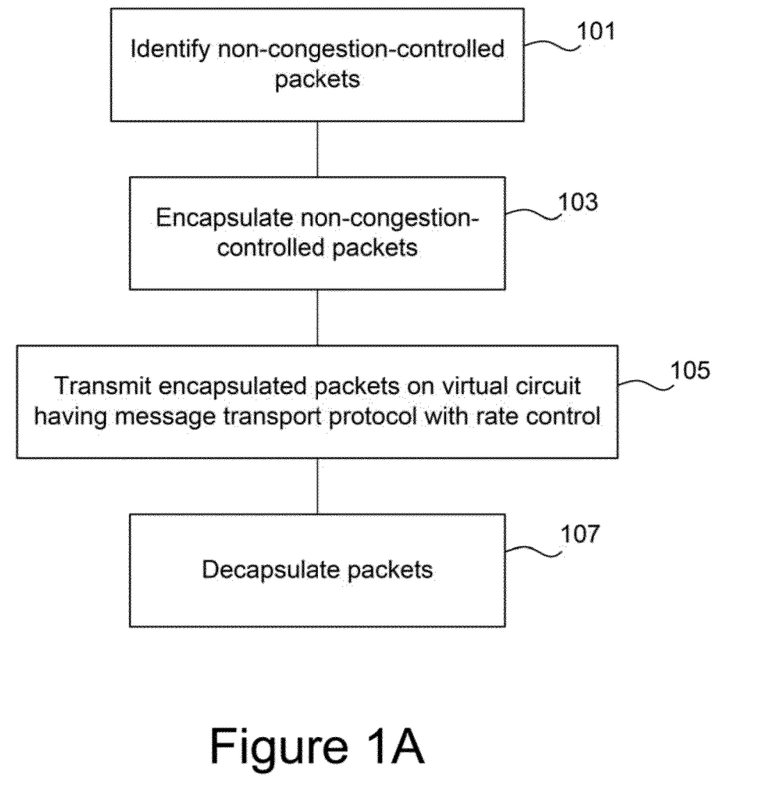
FIG. 1A is a flowchart illustrating a method of managing non-congestion-controlled traffic in a datacenter according to an embodiment.

A method of managing non-congestion-controlled traffic in a datacenter by diverting non-congestion-controlled packets, encapsulating them, and sending them via dedicated virtual circuits is shown in FIG. 1A. The method includes identifying any non-congestion-controlled packets originating in a sending server and intended for a receiving server (101), encapsulating the non-congestion-controlled packets (103), transmitting the encapsulated packets from the sending server to the receiving server through a virtual circuit having a message transport protocol with rate control (105), and decapsulating the packets (107).

The Datagram Congestion Control Protocol (DCCP) defined in IETF RFC4340, March 2006, defines a message transport protocol that provides TCP-friendly rate control for unreliable datagram flows. In some embodiments DCCP is used for the message transport protocol of the virtual circuits, and the non-congestion-controlled packets are encapsulated by adding DCCP headers to the packets.

Packets may be identified as non-congestion-controlled by identifying a type fields in headers of the packets. For example, the type field may indicate that the packets follow protocols such as UDP, ICMP, ARP, or other non-congestion-controlled protocols.

Packets may be identified as non-congestion-controlled according to a communication from a monitor link respecting message traffic congestion in upstream devices. For example, the rate at which traffic arrives at the monitor link may not react to congestion as expected. This may be the case if the rate at which traffic arrives does not change with packet volume, and packets are being dropped or queued.

Figure 1B:
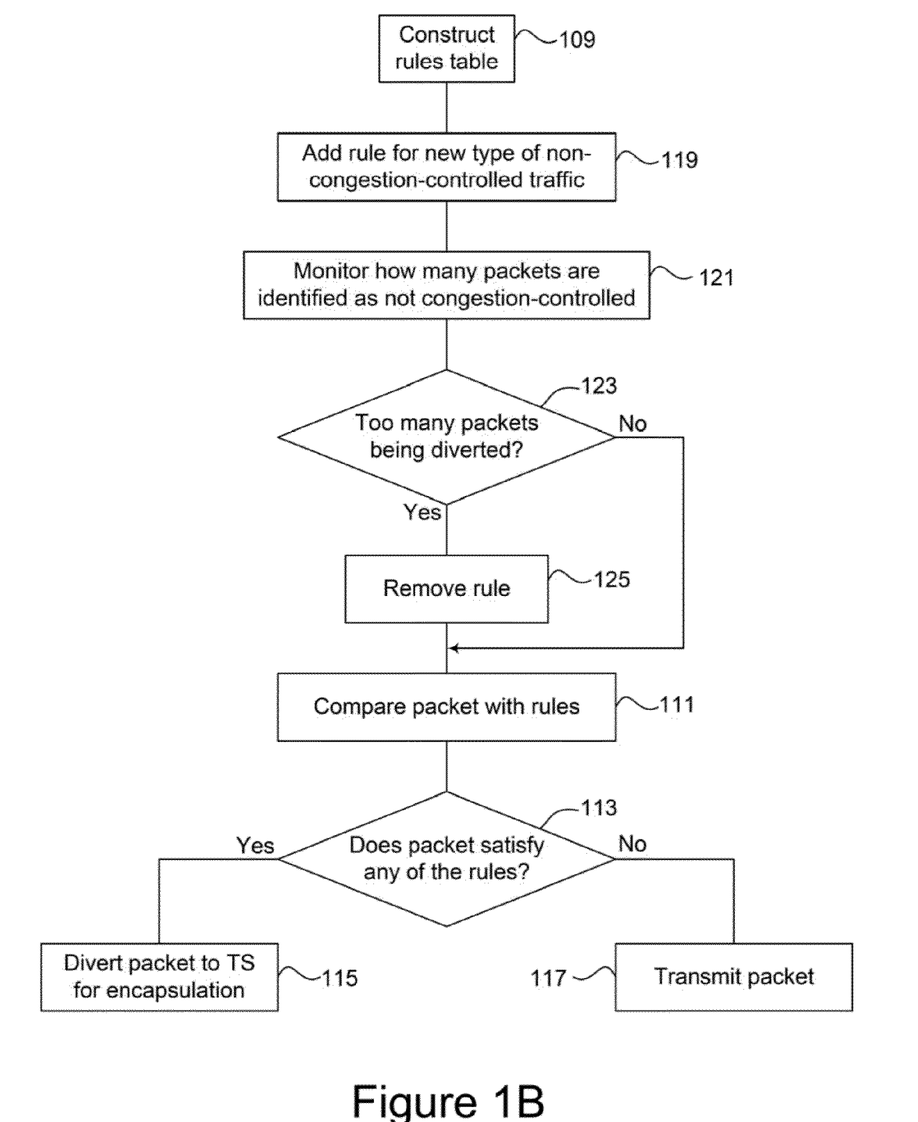
FIG. 1B is a flowchart illustrating aspects of a rules table for identifying packets to be diverted according to the method of FIG. 1A.

As shown in FIG. 1B, in some embodiments a table of rules that define packets as not congestion-controlled may be constructed (109). Packets that are not congestion-controlled may be identified by comparing the packets with the rules (111) and identifying any packet that satisfies any of the rules (113). If the packet satisfies any of the rules it is encapsulated (115). If the packet does not satisfy any of the rules, it is transmitted without being encapsulated (117).

Constructing the table of rules may include adding a rule descriptive of a packet that is not congestion-controlled (119). For example, whenever a new type of packet is identified as non-congestion-controlled, a rule may be added. A new rule might specify a particular destination address and transport protocol, and a matching rule would indicate that a packet intended for that address and using that transport protocol should be encapsulated and forwarded on a virtual circuit.

To avoid a situation in which over time more and more traffic becomes diverted to use virtual circuits instead of traversing the network without encapsulation, some embodiments include a mechanism to shift traffic away from the virtual circuits. Such a mechanism may be desirable if packets may be misidentified as non-congestion-controlled. The volume of packets identified as not congestion-controlled may be monitored (121). If too many packets are being encapsulated (123), rules may be removed from the table according to the monitoring (125). One way to select rules for removal is to remove them in the same order they were added (first-in-first-out, or FIFO). Using FIFO to identify rules for removal results in the oldest rules being removed first. Some rules, for example a rule that all UDP traffic must be sent on virtual circuits, may be marked as permanent, preventing removal.

Figure 1C:
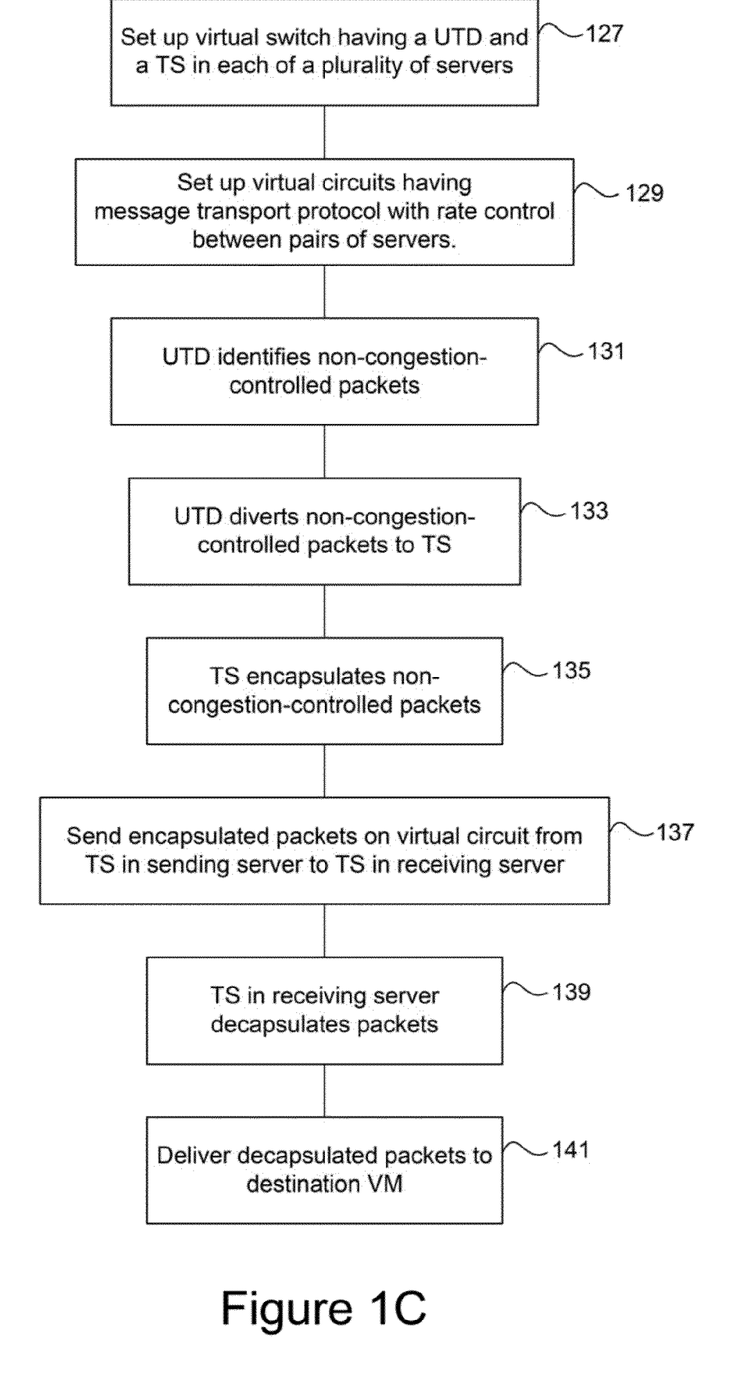
FIG. 1C shows another embodiment of a method of managing non-congestion-controlled traffic in a datacenter.

FIG. 1C shows another embodiment of a method of managing non-congestion-controlled traffic in a datacenter. The method begins with establishing a virtual switch that includes an uncontrolled traffic detector (UTD) and a tunneling service (TS) in each of a plurality of servers in the datacenter (127). Virtual circuits having a message transport protocol that includes rate control are established between the TSs in each pair of servers (129). The UTD in a sending server is used to identify not congestion-controlled packets that originate in a virtual machine (VM) in that server and that are addressed to a destination VM in a receiving server (131). The UTD diverts the non-congestion-controlled packets to the TS (133). The TS encapsulates the packets (135). The encapsulated packets are sent through the virtual circuit that extends between the TS in the sending server and a TS in the receiving server (137). The TS in the receiving server decapsulates the packets (139). The decapsulated packets are delivered to the destination VM.

In some embodiments the virtual circuits may be visible to virtual switch components in each server but not to the VMs. Virtual switches may be implemented as software modules that provide network switching capability between VMs at a server and between the VMs and the physical communication network. Virtual switches may be implemented as modules in a hypervisor, or as modules in a special driver-domain VM that provides networking services to VMs running tenant applications. Virtual switches may also be implemented in physical network interface cards (NICs) such as for example virtual switches available in SR-IOV (Single Root I/O Virtualization PCIe standard) NICs.

Sending an encapsulated message may include looking up an address of the destination VM in a look-up table and sending the message to that address.

Figure 2A:
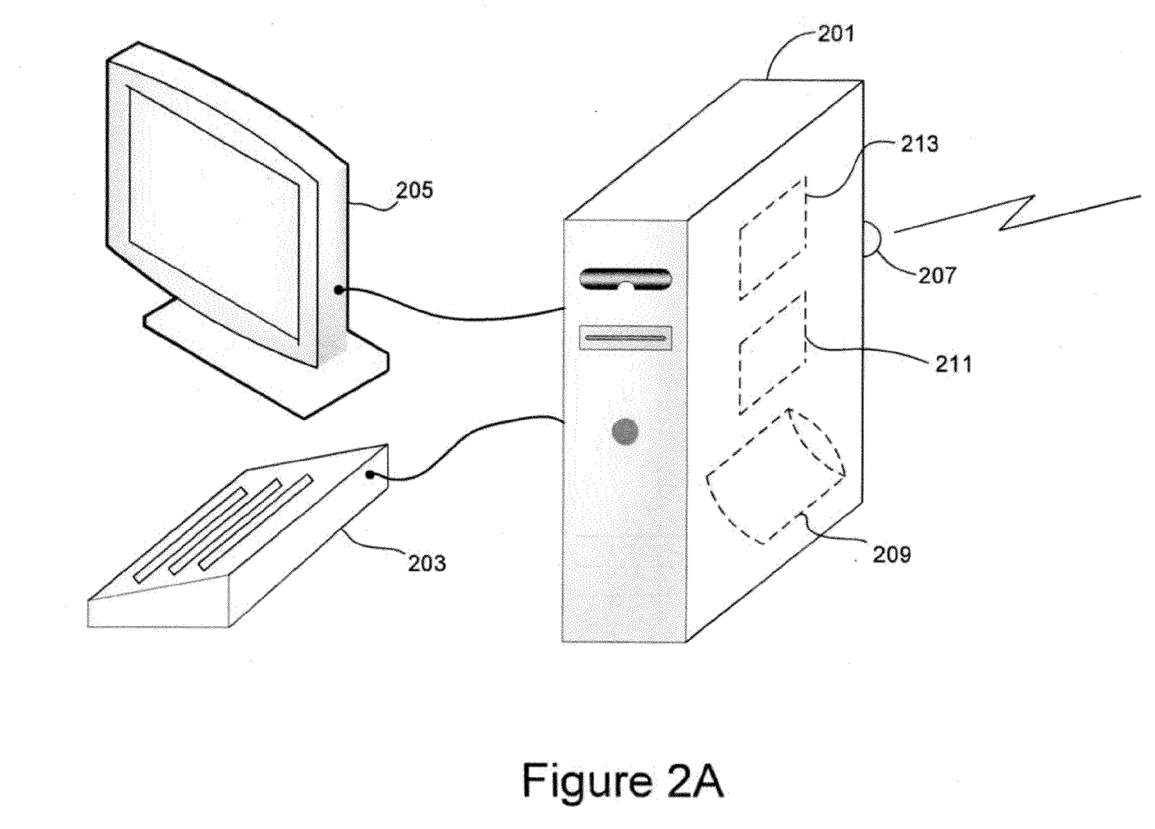
FIG. 2A is a pictorial representation of a server that manages non-congestion-controlled traffic in a datacenter according to an embodiment.
Figure 2B:
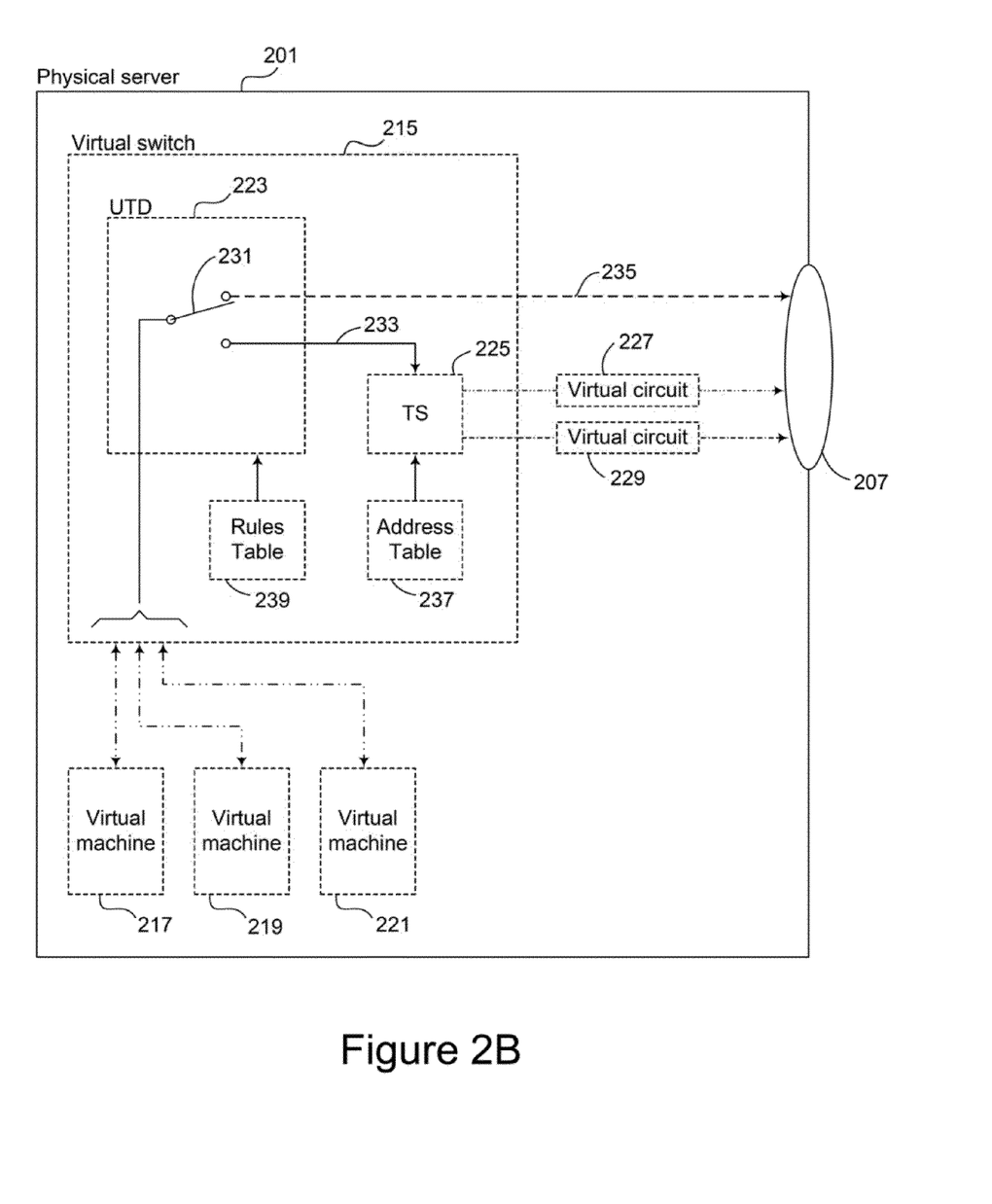
FIG. 2B is a block diagram of a portion of the server shown in FIG. 2A.

A computer system that manages non-congestion-controlled traffic in a datacenter is shown in FIGS. 2A and 2B. The computer system may comprise a server 201. The server may connect with user interface facilities such as a keyboard 203 and a display 205, but many servers in datacenters either have no such facilities or share them with other servers. The server includes a communication port 207 for sending and receiving messages and for other communication needs. The server includes machine-readable instructions that may be stored on a magnetic medium such as a hard disk 209 or in memory 211. The hard disk and memory are shown in the figure as physically located in the server, but either or both may be located elsewhere. The server includes a processor 213 responsive to the instructions to establish a VM, a virtual switch 215, and a virtual circuit.

Three VMs 217, 219, and 221 are shown, but any given server may have one or many VMs. Indeed, some servers may have no VMs at all, each such server instead being dedicated entirely to one tenant. Any message traffic originating from a tenant's application program running in such a server would be handled in the same way as VM message traffic.

The virtual switch 215 includes an uncontrolled traffic detector (UTD) 223 and a tunneling service (TS) 225. Two virtual circuits 227 and 229 are shown but in some embodiments there may be many more. For example, one virtual circuit may be established between each pair of TSs; in other words, if there are n servers in the datacenter and each server has a TS, every server would have n−1 virtual circuits, each server having a separate virtual circuit extending from the TS in that server to the TS in every other server.

Each packet originating in a TS in a server needs to be assigned to one of the n−1 virtual circuits at that server. There are many possible ways to accomplish this. For example, an address lookup service could be implemented and queried by the TS to determine the destination server, given a destination MAC address of a packet. The lookup service could be implemented through broadcast requests over the virtual circuits, analogous to an Address Resolution Protocol (ARP) used in Internet Protocol (IP). The TS may cache lookup results to avoid overloading the lookup service. In some embodiments VMs are migrated from one server to another, and if this happens the mapping needs to be updated so that packets addressed to a VM that has been migrated will not be sent on a virtual circuit to an obsolete location. Thus, upon migration, mappings for the migrated VM should be updated throughout the datacenter.

The UTD is responsive to packets generated by a VM in the server to divert non-congestion-controlled packets to the TS, for example through a communication line 233. This diversion is represented symbolically by a switch contact 231. A hardware switch could be used for this purpose, or the packet direction may take place in software under the control of the machine-readable instructions. The UTD may direct congestion-controlled packets to the communication port 207 without going through the TS, for example through a communication line 235.

The TS encapsulates a diverted packet and directs the encapsulated packet to the communication port 207 through one of the virtual circuits 227 and 229 according to which VM the message is addressed to. The virtual circuits have a message transport protocol, for example DCCP, that includes rate control. If DCCP is used, encapsulating a packet may mean adding a DCCP header to the packet.

In some embodiments the machine-readable instructions cause the server to construct a virtual-circuit address table 237 specifying the mapping of virtual machines addresses in other servers to virtual circuits. Each server may construct its own table, or one such table may be constructed by one server and then stored in memory for use by others of the servers. This table can be constructed through a learning process where an entry is added to the table when receiving a packet on a virtual circuit from a given source virtual machine address.

The processor may be responsive to the machine-readable instructions to construct a rules table 239 specifying categories of non-congestion-controlled messages to be diverted, as will be discussed in more detail presently.

The address table 237 and the rules table 239 are shown as being inside the virtual switch 215, but this is not necessary and one or both of these tables may be stored at another location in the server or elsewhere in the datacenter, in which case they may be accessed as needed by the UTD and the TS.

The UTD and TS may be implemented in hardware switches or network interface devices. In an embodiment in which network interface hardware supports VMs, for example through the PCI. Express Single-Root I/O Virtualization [SR-IOV] standard, virtual switches may not be appropriate, and in that case the UTD and TS may be implemented in network hardware devices instead of software virtual switches.

Figure 3:
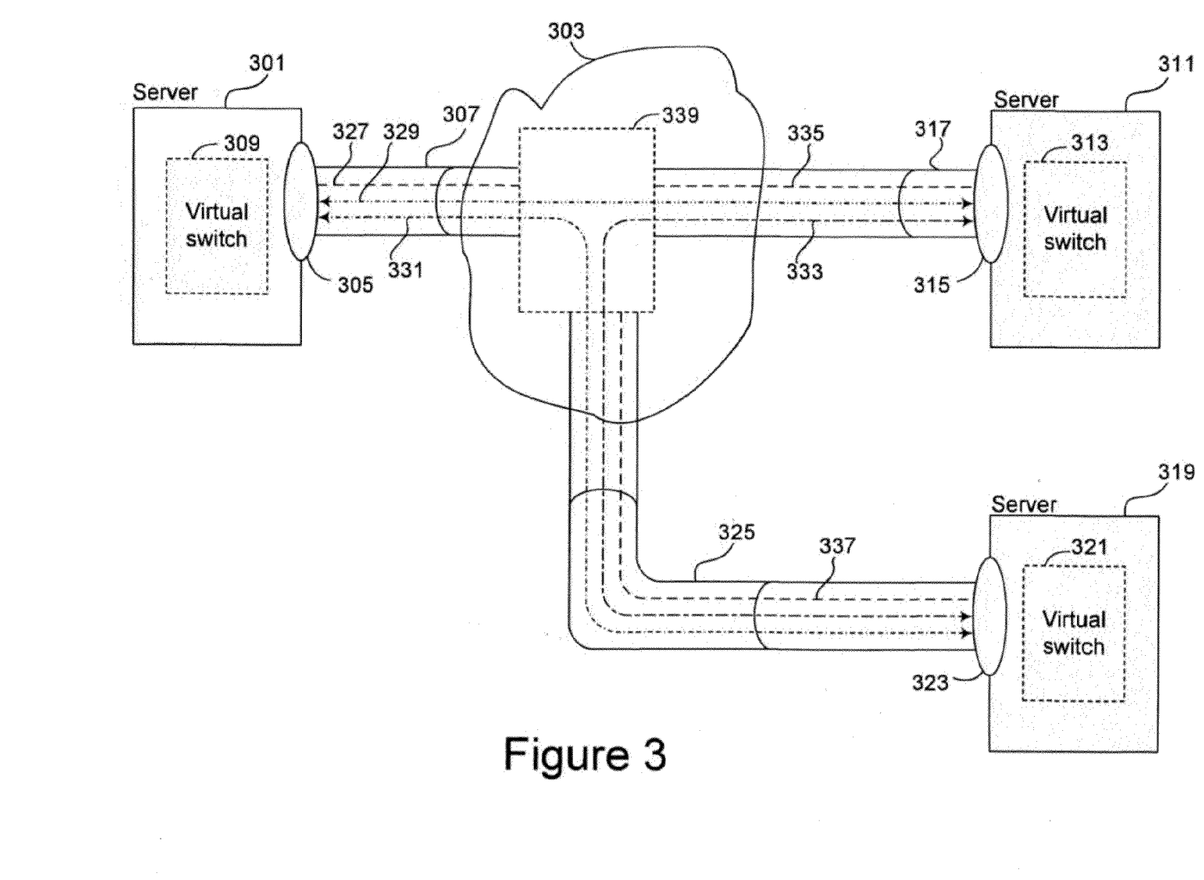
FIG. 3 is a block diagram of a portion of a communication network in a datacenter having servers such as the server shown in FIGS. 2A and 2B.

Referring now to FIG. 3, a first server 301 similar to the server 201 is shown connected to a communication network 303 through a communication port 305 and a connector 307 that extends from the communication port to the network. The connector 307 may be physically realized as an Ethernet cable, a wireless transmitter and receiver, or some other suitable electrical hookup. The server includes a virtual switch 309 similar to the virtual switch 215.

A second server 311 including a virtual switch 313 is connected to the communication network 303 through a communication port 315 and a connector 317, and a third server 319 including a virtual switch 321 is connected to the communication network through a communication port 323 and a connector 325. Of course, in a large datacenter there might be hundreds of similar servers all connected to the communication network.

Congestion-controlled packets may travel from the first server to the communication network through the connector 307 as indicated by a communication line 327. This type of message is directed by a UTD in the virtual switch 309 to the communication port 305 without diversion. The communication line 327 and other communication lines discussed herein are to be understood as symbolic representations of how messages travel rather than as indicating actual physical electrical connections.

The UTD diverts non-congestion-controlled packets to a TS for encapsulation. The IS then sends each encapsulated packet over the virtual circuit that extends between that IS and a TS in a virtual switch in a receiving server that includes the destination VM. For example, if a VM in the server 301 generates a non-congestion-controlled packet for a VM in the server 311, the TS in the server 301 encapsulates the packet and sends it over a virtual circuit 329 that extends between the TS in the server 301 and the TS in the server 311. Similarly, if a VM in the server 301 generates a non-congestion-controlled packet for a VM in the server 319, the TS in the server 301 encapsulates the packet and sends it over a virtual circuit 331 that extends between the TS in the server 301 and the IS in the server 319. And, if a VM in the server 311 generates a non-congestion-controlled packet for a VM in the server 319, the TS in the server 311 encapsulates the packet and sends it over a virtual circuit 331 that extends between the TS in the server 311 and the TS in the server 319. Congestion-controlled packets may travel between the server 311 and the communication network as indicated by a communication line 335, and between the server 319 and the communication network as indicated by a communication line 337.

The communication network 303 includes various hardware and software elements 339 that make actual connections and carry actual electrical signals between servers. These elements may be stand-alone devices or may be included in one or more servers in the datacenter; they may include one or more rate limiters that may be located anywhere in the communication network.

The non-congestion-controlled packets that are diverted for encapsulation may include all packets that are not congestion controlled may be a subset of such packets. For example, only UDP packets may be diverted. A monitor link may send a notice to a server to the effect that that server is not adjusting its transmission rate according to an applicable rate limit. If this happens, the UTD in that server may divert more of the non-congestion-controlled messages to the TS. There may be many different ways to select which messages are diverted for encapsulation and which ones are transmitted without encapsulation in the server. For example the server may encapsulate all packets sent to a specific destination virtual machine address, or all packets with a specific VLAN tag, or all packets for a specific TCP connection (identified by the source and destination virtual machine addresses and source and destination TCP port numbers). The selection of which messages should be diverted can be done using a table of rules such as the table 239. This table may be constructed and used by only one server, or each of several servers may construct its own table, or one table may be shared among several servers.

Figure 4:
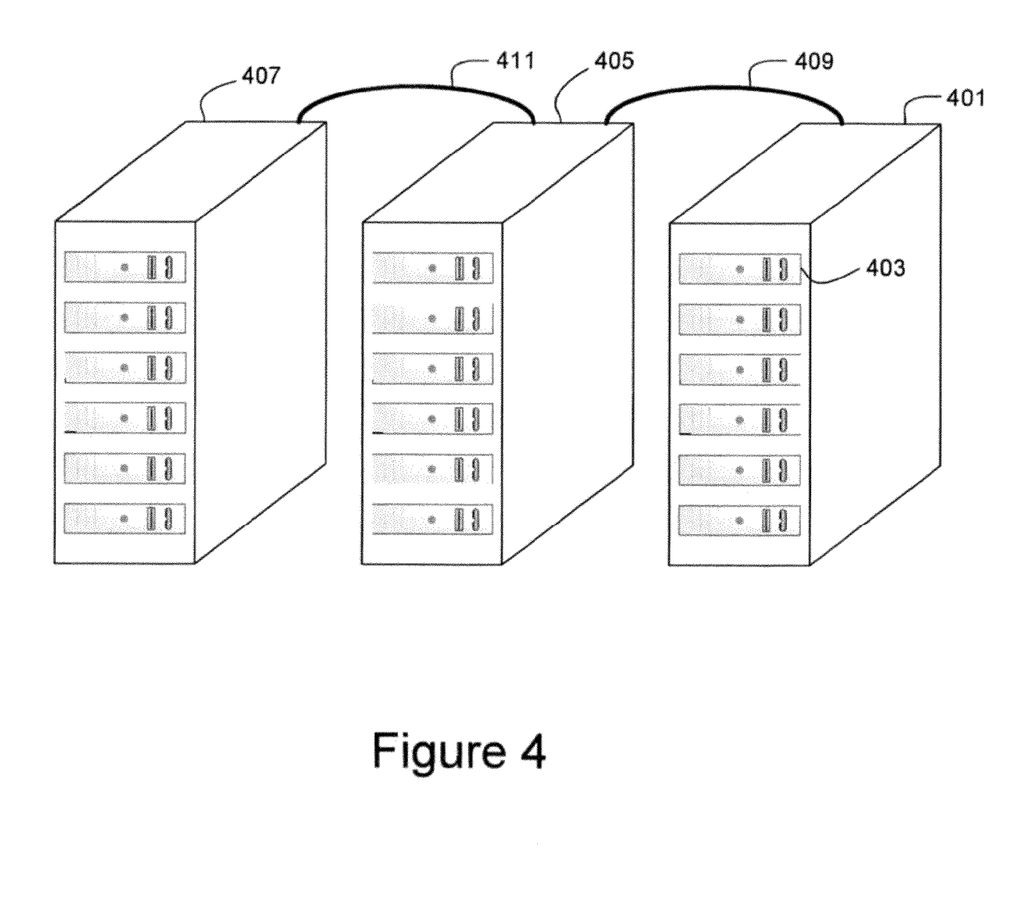
FIG. 4 is a pictorial representation of a portion of a datacenter.

A datacenter in which embodiments of the invention may be practiced is shown in FIG. 4. A first rack 401 contains a plurality of servers including a server 403 similar to the server 201. A second rack 405 contains another plurality of servers, as does a third rack 407. Communications between the servers in the first and second racks are carried by an electrical cable 409, and communications between the servers in the second and third racks are carried by an electrical cable 411. Other cables may carry communications between servers in the first and third racks, and amongst servers within a rack. Of course, some datacenters may have hundreds of racks each with varying numbers of servers.

Embodiments of the invention provide methods and apparatus for effectively managing non-congestion-controlled message traffic in a datacenter. Virtual machines in such a datacenter may use any transport protocol, and yet all message traffic is controllable. Traffic control may be implemented entirely at network endpoints or edge switches. This control may be achieved regardless of the behavior of tenant VMs.

We claim:

1. A method of managing non-congestion-controlled traffic in a datacenter, the method comprising:
    identifying any packets originating in a sending server and intended for a receiving server that are not congestion-controlled by detecting that traffic arrival at a monitor link of an upstream device does not change with packet volume;
    encapsulating the non-congestion-controlled packets;
    transmitting the encapsulated packets from the sending server to the receiving server through a virtual circuit having a message transport protocol with rate control; and
    decapsulating the packets;
    wherein identifying packets that are not congestion-controlled comprises comparing packets with the rules and identifying any packet that satisfies any of the rules.

2. The method of claim 1 wherein the message transport protocol comprises Datagram Congestion Control Protocol (DCCP) and encapsulating the identified packets comprises adding DCCP headers to the packets.

3. The method of claim 1 further comprising adding a rule, which rule is descriptive of a packet that is not congestion-controlled.

4. The method of claim 3 and further comprising monitoring how many packets are identified as not congestion-controlled and removing a rule from a rule table according to the monitoring.

5. The method of claim 4, wherein a rule is removed from the rule table in the order it was added.

6. The method of claim 4, further comprising preventing removal of a rule from the rule table by marking it as permanent.

7. The method of claim 1, further comprising identifying a packet that has been misidentified as a non-congestion-controlled packet.

8. The method of claim 1, further comprising encapsulating a subset of the non-congestion-controlled packets.

9. A method of managing non-congestion-controlled traffic in a datacenter, the method comprising:
- establishing a virtual switch that includes an uncontrolled traffic detector (UTD) and a tunneling service (TS) in each of a plurality of servers in the datacenter;
- establishing a dedicated virtual circuit with a message transport protocol that includes rate control between the TSs in each pair of servers;
- using the UTD in a sending server to identify packets that originate in a virtual machine (VM) in that server that are addressed to a destination VM in a receiving server;
- using the UTD in the sending server to identify packets that are not congestion-controlled by comparing packets with a rule table that defines packets as non-congestion-controlled and that specify a destination address, a transport protocol, or combinations thereof;
- using the UTD to divert the non-congestion-controlled packets to the TS;
- using the TS to encapsulate the diverted non-congestion-controlled packets;
- sending the encapsulated packets through the dedicated virtual circuit that extends between the TS in the sending server and a TS in the receiving server;
- shifting traffic away from the dedicated virtual circuit by removing rules from the rule table;
- using the TS in the receiving server to decapsulate the packets; and
- delivering the decapsulated packets to the destination VM.

10. The method of claim 9 wherein the message transport protocol in the virtual circuits comprises Datagram Congestion Control Protocol (DCCP) and using the TS to encapsulate the diverted packets comprises adding DCCP headers to the packets.

11. The method of claim 9 wherein using the UTD to identify packets that are not congestion-controlled comprises identifying type fields in headers of the packets, in which a type field identifies a category of non-congestion-controlled protocol.

12. The method of claim 9 wherein identifying packets that are not congestion-controlled comprises identifying any packet that satisfies a rule in the rule table.

13. The method of claim 12 and further comprising monitoring how many packets are identified as not congestion-controlled and removing rules from the rule table according to the monitoring.

14. The method of claim 9 further comprising adding a rule to the rule table, which rule is descriptive of a packet that is not congestion-controlled, in which a rule is added when a packet is identified as being non-congestion-controlled.

15. A computer system that manages non-congestion-controlled traffic in a datacenter, the computer system comprising:
- a communication port;
- machine-readable instructions stored on a non-transitory medium; and
- a processor responsive to the instructions to establish a virtual switch and a virtual circuit, the virtual circuit having a message transport protocol that includes rate control, and the virtual switch comprising an uncontrolled traffic detector (UTD) and a tunneling service (TS), the UTD identifies non-congestion controlled packets by detecting that traffic arrival at a monitor link of an upstream device does not change with packet volume and responsive to packets generated by a virtual machine (VM) in the computer system to divert a particular type of non-congestion-controlled packet to the TS, and the TS responsive to non-congestion-controlled packets to encapsulate the packets and to direct the encapsulated packets to the communication port through the virtual circuit;
- wherein the UTD diverts packets according to at least one of a type field in headers of the packets and a communication from a monitor link respecting message traffic congestion in upstream devices.

16. The computer system of claim 15, in which the non-congestion-controlled packets that are diverted correspond to a number of specific destination addresses.

17. The computer system of claim 15, in which the non-congestion-controlled packets that are diverted correspond to a specific type of connection.

18. A computer system that manages non-congestion-controlled traffic in a datacenter, the computer system comprising:
- a communication port;
- machine-readable instructions stored on a non-transitory medium; and
- a processor responsive to the instructions to establish a virtual switch and a virtual circuit, the virtual circuit having a message transport protocol that includes rate control, and the virtual switch comprising an uncontrolled traffic detector (UTD) and a tunneling service (TS), the UTD identifies non-congestion controlled packets by detecting that traffic arrival at a monitor link of an upstream device does not change with packet volume and responsive to packets generated by a virtual machine (VM) in the computer system to divert a particular type of non-congestion-controlled packet to the TS, and the TS responsive to non-congestion-controlled packets to encapsulate the packets and to direct the encapsulated packets to the communication port through the virtual circuit;
- wherein the processor is responsive to the instructions to construct a rule table specifying categories of non-congestion-controlled packets to be diverted.

* * * * *